United States Patent
Chapel et al.

(10) Patent No.: US 7,899,042 B2
(45) Date of Patent: Mar. 1, 2011

(54) INCREMENTAL MODULAR HOME GATEWAY

(75) Inventors: Claude Chapel, Rennes (FR); Jean-Charles Guillemot, Thorigne Fouillard (FR); Jean Le Roux, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 643 days.

(21) Appl. No.: 10/517,731

(22) PCT Filed: Jun. 5, 2003

(86) PCT No.: PCT/EP03/50216
§ 371 (c)(1),
(2), (4) Date: Dec. 8, 2004

(87) PCT Pub. No.: WO03/107594
PCT Pub. Date: Dec. 24, 2003

(65) Prior Publication Data
US 2005/0226237 A1    Oct. 13, 2005

(30) Foreign Application Priority Data
Jun. 13, 2002 (EP) .................... 02364030

(51) Int. Cl.
*H04L 12/28* (2006.01)
(52) U.S. Cl. ............ 370/389; 370/402; 370/536; 725/98
(58) Field of Classification Search .................. 370/389, 370/237, 536, 395.64, 401–405; 725/74, 725/95–98; 709/224, 227; 380/217; 713/201; 375/222
See application file for complete search history.

(56) References Cited

U.S. PATENT DOCUMENTS

| | | | |
|---|---|---|---|
| 6,073,176 A * | 6/2000 | Baindur et al. | 709/227 |
| 6,353,613 B1 * | 3/2002 | Kubota et al. | 370/389 |
| 6,359,911 B1 * | 3/2002 | Movshovich et al. | 370/536 |
| 6,366,731 B1 | 4/2002 | Na et al. | |
| 6,434,170 B1 * | 8/2002 | Movshovich et al. | 370/536 |
| 6,505,255 B1 * | 1/2003 | Akatsu et al. | 370/401 |

(Continued)

FOREIGN PATENT DOCUMENTS

EP    0971507    1/2000

OTHER PUBLICATIONS

R.H.J. Bloks: "The IEEE-1394 High Speed Serial Bus", Philips Journal of Research, Elsevier, Amsterdam, NL, vol. 50, No. 1/2, Jul. 1, 1996, pp. 209-216.

(Continued)

*Primary Examiner* — Kwang B Yao
*Assistant Examiner* — Jeffrey M Rutkowski
(74) *Attorney, Agent, or Firm* — Robert D. Shedd; Joseph J. Opalach; Jerome G. Schaefer

(57) ABSTRACT

The invention concerns a communication device including several external data sources, at least a local area network connecting peripherals, means enabling to establish connections between the local area network and the external data sources, means for controlling the incoming data from the external sources and for sending them to the local area network in order to reduce the bandwidth occupation on the local area network. The device also includes means for updating signalization tables included in the incoming data and means for inserting the modified signalization tables in the transport stream sent to the local area network. It is applicable to IEEE 1394 networks.

7 Claims, 3 Drawing Sheets

U.S. PATENT DOCUMENTS

| | | | | |
|---|---|---|---|---|
| 6,526,581 B1 * | 2/2003 | Edson | | 725/74 |
| 6,628,617 B1 * | 9/2003 | Karol et al. | | 370/352 |
| 6,647,015 B2 * | 11/2003 | Malkemes et al. | | 370/401 |
| 6,690,675 B1 * | 2/2004 | Kung et al. | | 370/401 |
| 6,762,690 B1 | 7/2004 | Diehl et al. | | |
| 6,819,664 B1 * | 11/2004 | Jeong | | 370/401 |
| 6,850,252 B1 * | 2/2005 | Hoffberg | | 715/716 |
| 6,968,376 B2 * | 11/2005 | Horie et al. | | 709/224 |
| 2001/0012319 A1 * | 8/2001 | Foley | | 375/222 |
| 2002/0067718 A1 * | 6/2002 | Coupe et al. | | 370/389 |
| 2002/0080753 A1 * | 6/2002 | Lee | | 370/401 |
| 2003/0018917 A1 * | 1/2003 | Brown, Sr. | | 713/201 |

OTHER PUBLICATIONS

Search Report Dated Sep. 15, 2003.

* cited by examiner

INCREMENTAL MODULAR HOME GATEWAY

This application claims the benefit, under 35 U.S.C. §365 of International Application PCT/EP03/50216, filed Jun. 5, 2003, which was published in accordance with PCT Article 21(2) on Dec. 24, 2003 in English and which claims the benefit of European patent application No. 02364030.3, filed Jun. 13, 2002.

The invention concerns a communication device and a communication method.

BACKGROUND OF THE INVENTION

The invention can be applied for example in the field of home networks.

Typically, a home network allows communication, connection, interoperability between video equipments for personal or recorded video displaying, video games, . . . but mainly it should give to the user the opportunity to communicate easily with the external world.

Video programs, images, music, text pages, information data can be accessed from numerous sources provided by different heterogeneous means of transmission.

For example, television can be broadcasted from satellite, terrestrial, cable, LMDS (Broadcast Network) or delivered by Internet (Broadband Network). That is also true for music or web pages. There is no limit in mixing technologies.

A first approach to connect and adapt the home network to the outside world is to use a residential gateway that has numerous means of reception, a bridge that translates the transport protocol of the incoming data to the protocol supported by the home network.

A solution, commonly proposed, is to provide a box with slots (commonly PCI slots) in which the proper daughter boards are inserted according to the accesses requested by the user.

Such a solution is proposed in the patent application WO 00/11840 filed in the name of Mitsubishi on Aug. 12, 1999 entitled "home gateway".

This solution presents a lot of drawbacks that are commonly not admitted in consumer products:

- In consumer products, opening the box is performed by servicing people only. Allowing consumer to add boards by himself is not admitted.
- The basic platform that will receive add-on board(s) has features that will never be used, but they must be paid by the consumer, making the product less competitive for low-end configuration.
- More complicated the product is, more expensive it is. Connectors, oversize power supply, large case . . . don't characterize low cost product.
- An open system can be tampered more easily, paving the way to the hackers for unauthorized acts.

Patent applications WO 99/57839 entitled "method and apparatus for user and device command and control in a network" filed on May 7, 1999 and WO 01/13374 entitled "device communication and control in a home network connected to an external network" filed on Aug. 17, 2000, both filed in the name of Samsung, describe a system interconnecting several external sources to a local area network. Each module provides a connection with an external data source. However, such modules do not modify the incoming stream in order to enable the cohabitation of several streams on the local area network and in particular do not adapt the incoming streams data rate to the limited bandwidth of a local area network.

BRIEF SUMMARY OF THE INVENTION

The invention proposes a communication device comprising
- several external data sources,
- at least a local area network connecting peripherals,
- means enabling to establish connections between the local area network and the external data sources,
- means for controlling the incoming data from the external sources and sending them to the local area network in order to reduce the bandwidth occupation on the local area network.

According to the invention, the device comprises:
- means for updating signalization tables comprised in the incoming data,
- means for inserting the modified signalization tables in the stream sent to the local area network.

Such a device controls the incoming data and thus, when the local area network is connected to many external sources, the invention is particularly suitable as it improves the simultaneous transfers of data from the different external sources.

According to a preferred embodiment, the communication device is intended to establish one connection with an external source upon request of peripherals of the local area network.

The connection with an external source is then made when requested, this can enable to save bandwidth on the local area network. Moreover, thanks to the means for controlling the incoming data, the bandwidth occupation is optimized for serving as many as possible requests from the peripherals.

According to a preferred embodiment, the communication device comprises filtering means intended to remove some data coming from the external sources to create a single program transport stream or a partial multiple program transport stream for the local area network from the multiple program transport stream selected from the external source.

A way to reduce the bandwidth is to remove the unnecessary information from the incoming data stream. When the incoming data stream comprises transport streams composed of several programs, some of the programs may not be requested by peripherals on the local area network. Thus a way to reduce the bandwidth is to remove the programs having packet identifiers not requested by the peripherals.

According to a preferred embodiment, the communication device comprises
- means for updating signalization tables comprised in the incoming data,
- means for inserting the modified signalization tables in the stream sent to the local area network.

When the incoming data is composed of several audio and video streams, the selection of one or more audio or video programs implies also the modification of the tables describing the content of the stream. The tables are modified and then reinserted in the modified stream.

According to a preferred embodiment, the filtering means are intended to remove packets containing non-requested packet identifiers from the multiple transport streams to create single transport streams.

According to a preferred embodiment, the communication device has means to guarantee a copy protection of the data coming from the external source.

Content protection is a key concern in providing audio video data to subscribers.

Some audio video digital programs, music, data are free, some others are in the copyright. These ones are mostly scrambled.

When a customer has paid rights, he can display and record the analog pictures.

In a network, every data of any type can be stored, modified, transmitted, duplicated without significant distortion thanks to the powerful features of the digital equipments that are interconnected.

Royalties must me preserved on one hand and, in the other hand, some copy permission could be granted to the customer.

For the customer, copy permission could be as simple as an instant display or as permissible as a full ownership. Access control level is granted by the owner of the material and the rights are managed by the access control of the gateway module.

Thanks to the access control from the gateway module, all the data in the copyright that are available in the home network have been given the access by the copy protection system.

According to a preferred embodiment, the local area network is compliant with IEEE-1394 protocol.

According to a preferred embodiment, the communication device is intended to generate a data stream on the local area network compliant with DVB or DSS standard.

The invention also concerns a system comprising:
Several external data sources,
At least a local area network connecting peripherals,
A gateway enabling to establish connections between the local area network and the external data sources, the gateway
being distributed among some peripherals, called gateway modules, and
comprising means for managing the introduction or the withdrawal of new gateways modules,
Each gateway module comprising means enabling it to establish a complete connection between the local area network and an external source, the other gateway modules having established or not a connection with an external source,
Characterized in that each gateway module is a communication device according to claims 1 to 9.

When the home network is compliant with the IEEE-1394 network, an other fact is often ignored by IEEE-1394 gateway designers:
The number of simultaneous accesses to the gateway is limited by the number of isochronous channels that can be opened, mainly due to hardware limitations. That feature depends on the IEEE1394 bus chipset. So, even many slots are populated, only one, two or, in any case, a finite number of them would be used simultaneously.

A modular gateway as proposed can enable the access to several isochronous channels as each module has its own IEEE-1394 interface and the controlling means enable the cohabitation of the different isochronous channels by sharing the bandwidth among the different gateway modules.

The invention also concerns a communication method between several external data sources and a local area network, said local area network connecting peripherals, comprising the step of:
enabling the set-up of connections between the local area network and the external data sources,
characterized in that it further comprises the step of:
controlling the incoming data from the external sources and sending them to the local area network in order to reduce the bandwidth occupation on the local area network,
said method being preferably intended to be implemented in a device according to any embodiment of the invention.

The invention also concerns a computer program product comprising program instructions for executing the steps of the method for creating semantic browsing options according to the invention, when said program is loaded on a computer.

BRIEF DESCRIPTION OF THE DRAWINGS

Further features of the invention will appear in the following description of exemplary embodiments made with reference to the attached drawing where.

DETAILED DESCRIPTION OF THE INVENTION

The preferred embodiment illustrated by the different figures is based on a local area network compliant with the IEEE-1394 standard and the incoming stream is compliant with MPEG-2 standard.

Figure 1:
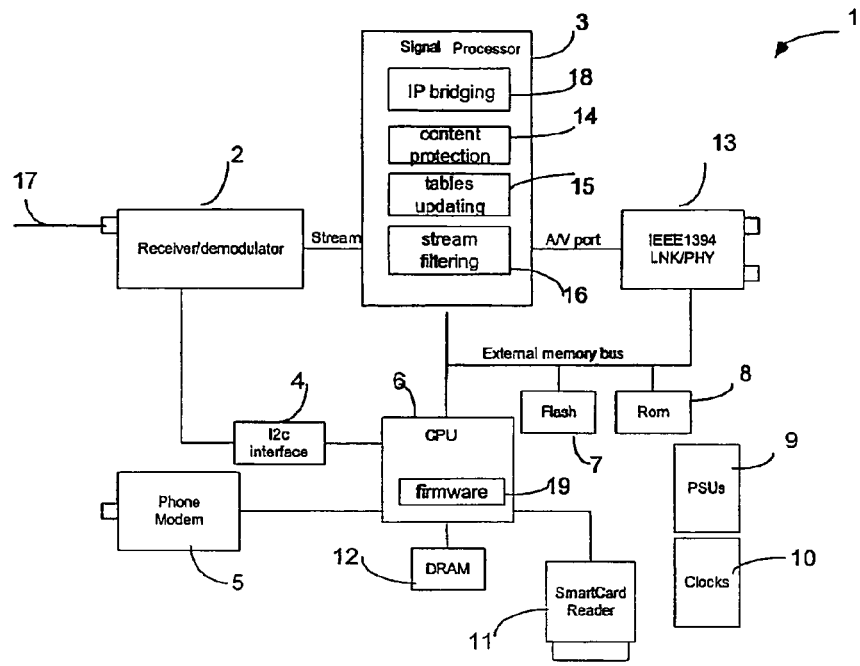
FIG. 1 represents a communication device according to an embodiment of the invention.

On FIG. 1, the device 1 comprises a receiver/demodulator module 2 connected to an external network 17.

The external network 17 can be a broadcast network, such as a satellite, a terrestrial or a cable network. The receiver demodulator module 2 comprises radio frequency circuits, a QPSK (standing for "Quaternary Phase Shift Keying", a COFDM (standing for "Coded Orthogonal Frequency Division Multiplexing") or QAM (standing for "Quadrature Amplitude Modulation") demodulator according to the type of chosen front end.

The external network can also be a broadband network such as an ADSL (standing for "Asymmetric Digital Subscriber Line") network. It gives the means of communication according to the IP protocol for accessing the broadband network.

The receiver demodulator 2 is connected to a signal processor 3.

The signal processor 3 comprises at least a stream filtering module 16, a tables updating module 15, a content protection module 14 and an IP bridging module 18.

The filtering module is in charge of controlling the incoming data from the external network 17, in order to save bandwidth on the IEEE-1394 network.

Saving bandwidth on the local area network is particularly important when several communication devices 1 are connected to the local area network. Each of the device being for instance connected to a different external network, enabling the end user to access several external networks such as ADSL, cable, satellite, . . . .

One limit in connecting a large number of devices 1 is the bandwidth of the IEEE-1394 network at a given time. When the client terminal, called also peripheral, is requiring a new stream, the local area network can afford the extra load or not.

The interoperability middleware takes care about the status of the home network and assists the user to optimize the network via the User Interface.

Very often, only a program from a multiple program stream is requested so the required bandwidth is reduced; if the incoming stream is compliant with MPEG-2, the stream can be reduced from 30 Mb/s (the whole multiple program) to 4 Mb/s. So, each time one program is requested, the stream is sorted to make a SPTS (Single Program Transport Stream) from the MPTS (Multiple Program Transport Stream).

The Program Tables are modified in relationship with the new content of the stream.

The SPTS is created by removing unused PIDs (standing for "Packet Identifiers") from the MPTS without modifying the PTS/DTS (standing for "Presentation Time Stamp/Decode Time Stamp"), then the packets occupy the same temporal location making a stream with holes.

The resultant transport stream is DVB (standing for "Digital Video Broadcast") or DSS (standing for "Digital Satellite System") compliant so it is directly sent to the IEEE-1394 bus chipset that is designed for broadcasting isochronous DVB or DSS streams on the home network.

Figure 2:
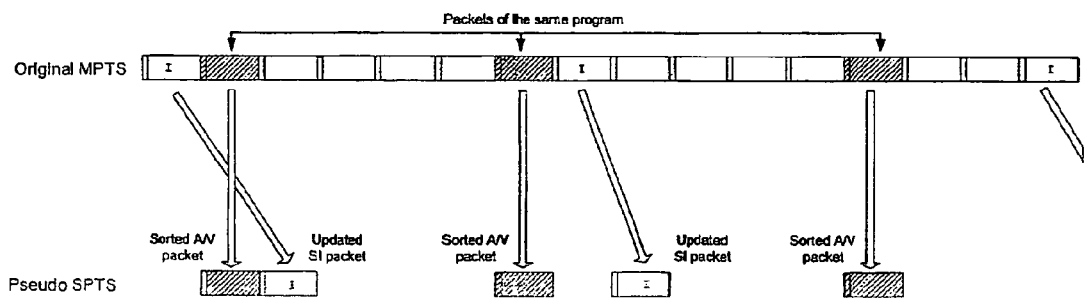
FIG. 2 represents an example of a stream filtering process.

FIG. 2, described later, represents an example of the filtered stream

The signal processor 3 comprises also a module 15 in charge of updating the tables of the incoming stream towards the filtered stream.

The transport stream tables of information describe the content of the stream. They are transmitted inside packets with a known packet identifier (PID).

These packets of data are sorted and temporary stored in a memory of the signal processor 3, such as a FIFO (standing for "First-In First-Out") memory.

When a predetermined number of packets are stored, they are transferred to the DRAM (standing for "Dynamic Random Access Memory") 12. The tables are then analyzed by a processor 6, modified and updated. Then, they are transferred back to the memory of the signal processor 3. As soon as a packet is ready, it is inserted into the stream in place of a hole in the stream. The holes are created by the filtering module when some packets containing non requested PIDs are removed from the MPTS stream.

The signal processor 3 comprises also an IP (standing for "Internet Protocol") bridging module 18.

IP bridging is performed according to the RFC 2374 December 1999 by P. Johansson that specifies how to use the IEEE Std-1394-1995 for a high performance serial bus, for the transport of Internet Protocol version 4 (Ipv4) datagrams; it defines the necessary methods, data structures and codes for that purpose. These include not only packet formats and encapsulation methods for datagrams, but also an Address Resolution Protocol (1394 ARP) and a Multicast Channel Allocation Protocol (MCAP). Both 1394 ARP and MCAP are specific to Serial bus; the latter permits management of serial bus resources when used by IP multicast groups.

The module 3 comprises also a content protection module 14.

As explained earlier, the copy protection system enables the copyright protection of the programs and also enables, if allowed, the copy permission to the end user.

Such a content protection module is thus important in the field of audio video content where copy protection is a key concern.

In a preferred embodiment, the used copy protection system is associated with a smart card reader 11. The smart card reader enables the user to be identified and informs also the device 1 of the rights of the user.

The signal processor module is connected to an IEEE-1394 port 13 composed of a link layer and of a physical layer. It is a standard interface to an IEEE-1394 network. Two IEEE-1394 ports are connected to enable the chaining of peripherals.

A flash memory 7 and a read only memory (ROM) 8 are connected to the IEEE-1394 port, to a processor 6 and to the signal processor 3.

The flash memory 7 and the Rom memory 8 are used by the processor 6 to store the code instructions. A DRAM (standing for "Dynamic Random Access Memory") 12 is also connected to the processor.

Device 1 also comprises a power supply unit 9, and a clock module 10 in charge of providing clocks to the different modules of device 1.

An I2C (standing for "Inter-Integrated Circuit") interface is also connected to the receiver demodulator 2 and to the processor 6. The registers of the tuner and the demodulator are programmed through the serial bus interface I2C.

A phone modem 5, that performs the access to the external network, allows the connection with the broadcaster for interactive TV or the connection to a server for Internet services.

In the cable version, not represented, a modulator can be added to provide a return channel for data returned to a server by using the cable as a bi-directional link.

A firmware 19 is also running under the control of the processor and will be described with the help of FIG. 4.

FIG. 2 represents an embodiment of a filtered stream.

The incoming stream is, in a preferred embodiment, a Multiple Program Transport Stream (MPTS) compliant with MPEG-2 standard.

Such a stream includes multiple programs. Among these programs, some of them may not be required by the peripherals located on the IEEE-1394 network. So the filtering module 16 of the signal processor 3 is in charge of removing the data packets, which are not required by the peripherals.

The MPTS stream comprises also the information tables represented by the SI (standing for "System Information") packets. SI packets are extracted from the incoming MPTS stream and modified according to the newly created stream, called pseudo SPTS stream, which contains only the data packets, which are requested by the peripherals, the modified SI packets and holes instead of the removed packets.

Figure 3:
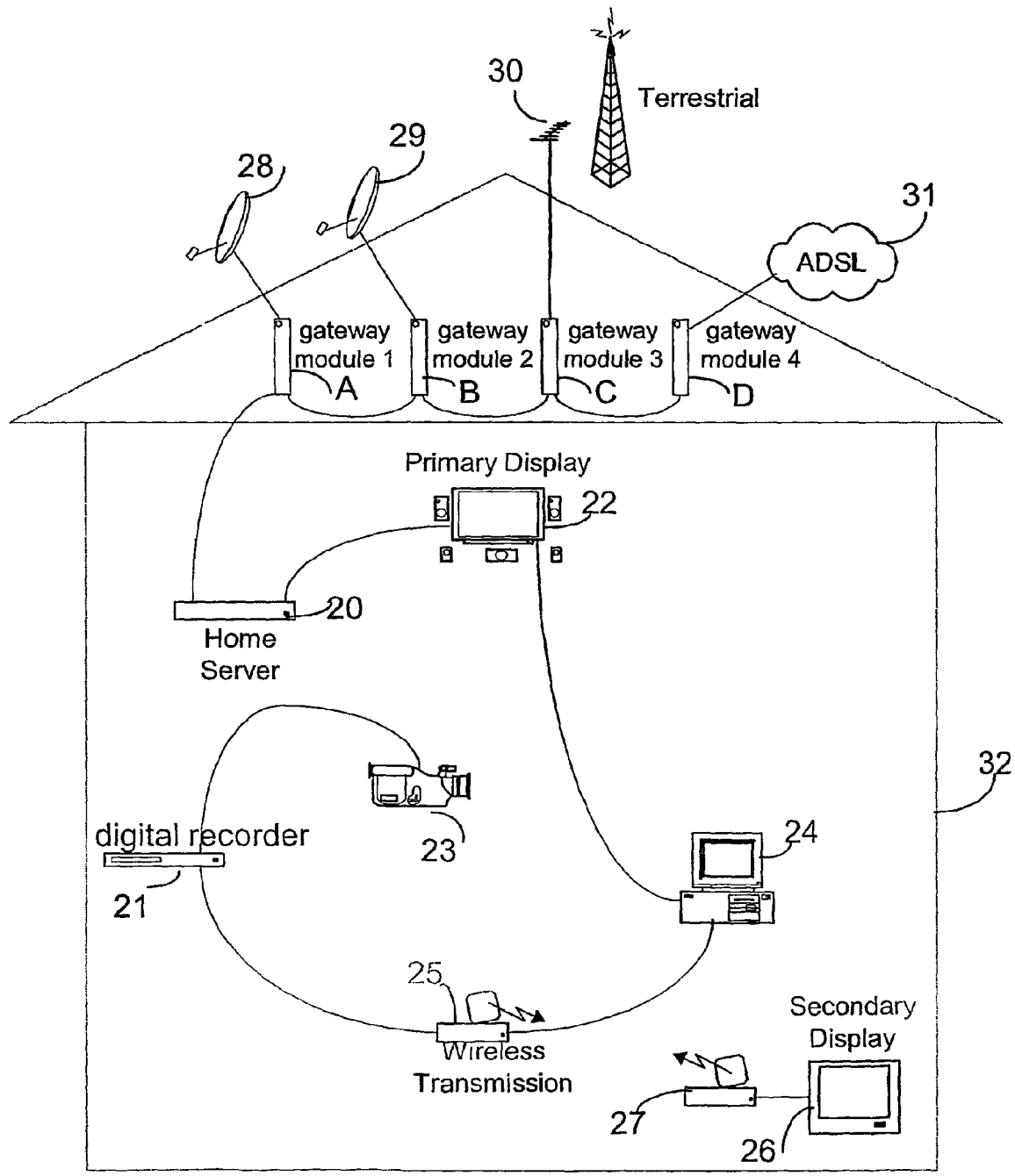
FIG. 3 represents a system implementing gateway modules according to an embodiment of the invention.

FIG. 3 represents a system including several devices 1 according to a preferred embodiment of the invention.

A house 32 comprising a home network connected to external sources, 28, 29, 30, 31, is represented.

The home network comprises an IEEE-1394 network connecting several peripherals such as a home server 20, a primary display 22, a camcorder 23, a digital recorder 21, a personal computer 24, a secondary display 26 and two wireless transmission modules 25 and 27.

Four devices A, B, C, D, also called gateway modules, are each connected to an external source.

Modules A and B are respectively connected to satellite antennas 28 and 29. Module C is connected to a terrestrial TV antenna 30, module D is connected to an ADSL network 31.

The gateway modules are, in a preferred embodiment, clustered in an attic or a cellar of the house. They are chained and only one optical fiber links the cluster to the rest of the network. Such an optical fiber enables to have a relatively long haul transmission or link between the cluster of gateways and the rest of the network. This can be of interest for a home installation purpose.

Such a system enables the connection to several external sources and the number of connections is not limited by the bandwidth of the network as each of the gateway modules has controlling means enabling it to optimize the amount of data sent to the local area network. Moreover, one great advantage of having each gateway connected to an external source is that each of the gateway module has an IEEE-1394 port and thus a sufficient number of isochronous channels can be handled simultaneously. The gateway is thus distributed, fully scalable, giving the end user the best freedom in building its own network. The global gateway function is the sum of small hardware devices controlled by clients in a home network. Clients can be the displays 22 or 26, the home server 20, the digital recorder 21 or the analog camcorder 23.

Figure 4:
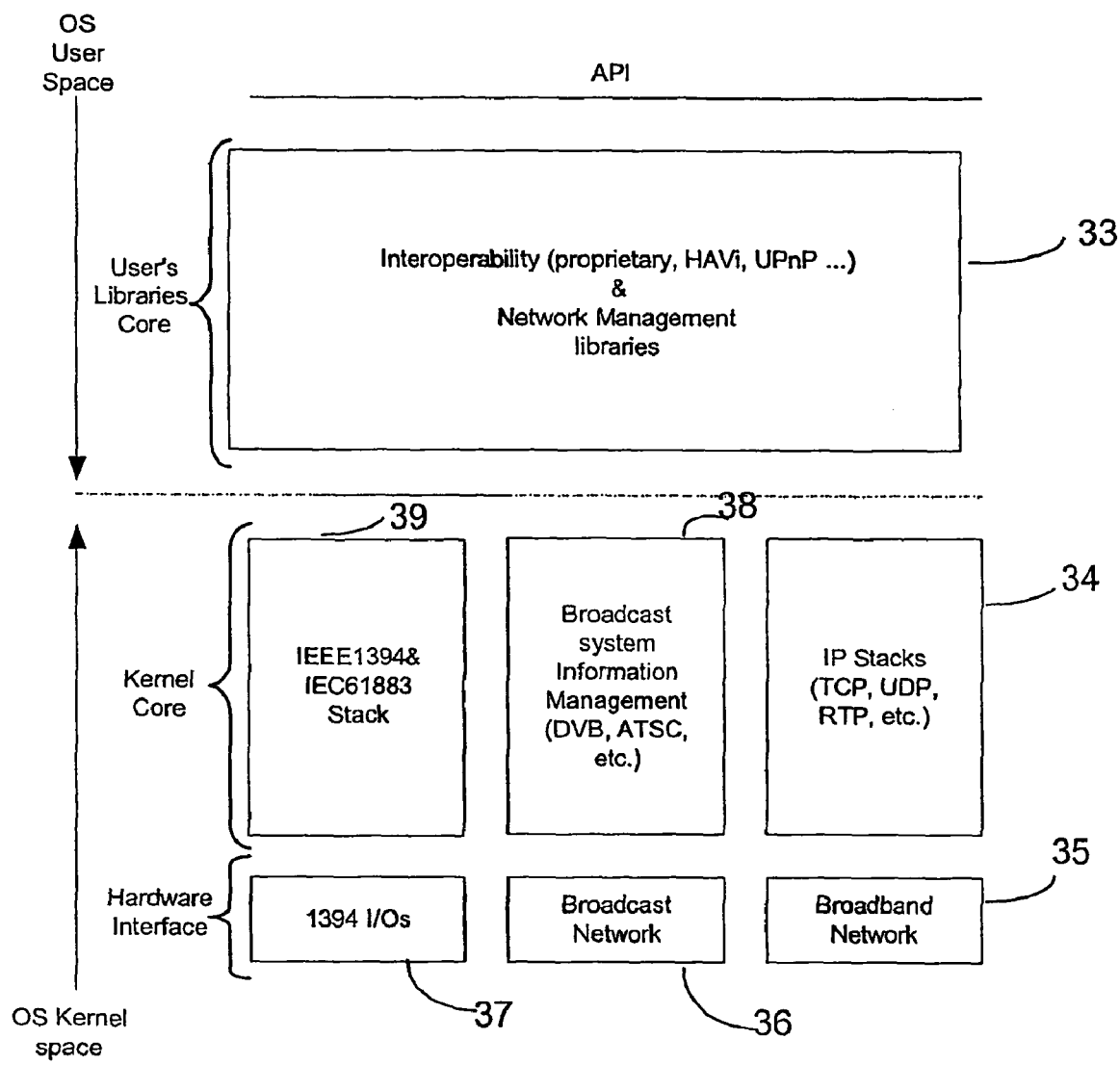
FIG. 4 represents the layers and the protocol stacks that control a device according to a preferred embodiment of the invention.

FIG. 4 gives an illustration of the layers and the protocol stacks controlling the device 1.

The firmware stack is running under control of a real time operating system.

At low level, the hardware adaptation layers are composed of several interfaces according to the external sources that are connected.

The hardware adaptation layers make the interface between the receivers and the upper protocol stacks.

The hardware interface in use is depending on the type of the gateway module: it depends on the external source the gateway module is connected to.

A module 37 controls the access to the IEEE-1394 local area network.

A module 35 controls the access to the broadcast network and a module 35 controls the access to the broadband network.

The upper layer is a kernel core in charge of the protocols supported by the gateway modules. The kernel core comprises:
- a module 39 for managing the IEEE-1394 link,
- a module 38 dealing with the DVB, DSS, ATSC (standing for "Advanced Television System Committee") transport streams. The protocol stack is compliant with the standardized specifications.
- a module 34 supporting main transport protocols like TCP (standing for "Transmission Control Protocol"), UDP (standing for "User Datagram Protocol"), RTP (standing for "Real time Transport Protocol").

The upper layer called "user's libraries core" supports a proprietary interoperability protocol. In another embodiment HAVI (standing for "Home Audio Video interoperability") or other protocol can also be implemented.

An API (standing for "Application Programming Interface") is delivered for allowing an easy implementation of the user application. The user application includes the remote control of the gateway module, data processing . . .

The invention claimed is:

1. A system comprising:
    external data sources,
    a local area network connecting peripherals,
    a gateway for establishing connections between the local area network and the external data sources, the gateway being scalable such that the gateway is distributed among some peripherals called gateway modules, each gateway module connected to at least one external data source, the gateway modules being chained together, and each gateway module managing introduction or withdrawal of new gateway modules, each gateway module comprising means to establish the complete connection between the local area network and the external data source independently of whether other gateway modules have established a connection with an external source, wherein each gateway module handles a plurality of isochronous channels on the local area network, wherein adding new gateway modules increases the number of isochronous channels on the local area network, and wherein each gateway module has means for controlling incoming data from a multiple program transport stream received from one external data source according to one request of a peripheral on the local area network and for sending the incoming data received from the one external data source to the local area network in order to reduce bandwidth occupation on the local area network.

2. The system according to claim 1, wherein the gateway module comprises:
    means for updating signalization tables comprised of the incoming data, and
    means for inserting the modified signalization tables in the transport stream sent to the local area network.

3. The system according to claim 1, wherein the filtering means removes packets containing non-requested packet identifiers from the multiple program transport streams to create the single program transport stream.

4. The system according to claim 1, wherein the gateway module has means to guarantee a copy protection of the incoming data coming from the external source.

5. The system according to claim 1, wherein the local area network is compliant with IEEE-1394 protocol.

6. The system according to claim 1, wherein the gateway module generates a data stream on the local area network compliant with DVB or DSS standard.

7. A system according to claim 1, wherein the means for controlling incoming data comprises filtering means for removing some of the incoming data to create a single program transport stream or a partial multiple transport stream for the local area network from the multiple program transport stream, wherein packets of the single program transport stream or the partial multiple transport stream occupy a same temporal location as corresponding packets in the multiple program transport stream.

* * * * *